United States Patent [19]

Mikkor

[11] Patent Number: 4,497,882

[45] Date of Patent: Feb. 5, 1985

[54] METHOD OF PREPARING AN ARTICLE WHICH IS RESISTANT TO CORROSIVE ATTACK BY MOLTEN POLYSULFIDE SALTS

[75] Inventor: Mati Mikkor, Ann Arbor, Mich.

[73] Assignee: Ford Motor Company, Dearborn, Mich.

[21] Appl. No.: 577,471

[22] Filed: Feb. 6, 1984

[51] Int. Cl.³ .............................................. H01M 2/02
[52] U.S. Cl. .................................... 429/163; 429/104; 29/623.5
[58] Field of Search ............... 429/104, 163; 29/623.1, 29/623.5

[56] References Cited

U.S. PATENT DOCUMENTS

| | | | |
|---|---|---|---|
| 4,024,320 | 5/1977 | Gibson et al. | 429/104 |
| 4,052,535 | 10/1977 | Robinson et al. | 429/104 |
| 4,069,372 | 1/1978 | Voinov | 429/104 |
| 4,125,682 | 11/1978 | Bordet et al. | 429/104 |
| 4,129,690 | 12/1978 | Jones et al. | 429/104 |
| 4,234,668 | 11/1980 | Hartmann et al. | 429/163 |
| 4,414,296 | 11/1983 | Mennicke et al. | 429/104 |
| 4,456,664 | 6/1984 | Crosbie et al. | 429/104 |

FOREIGN PATENT DOCUMENTS

| | | | |
|---|---|---|---|
| 2013022 | 11/1977 | United Kingdom . | |
| 1595192 | 8/1981 | United Kingdom | 429/104 |

OTHER PUBLICATIONS

Bird et al., Sodium Sulfur Cell Design for Quantity Production, Proceeding of the 13th Intersociety Energy Conversion Engineering Conf., Aug. 20-25, 1978, Society of Automotive Eng. Inc.

*Primary Examiner*—Donald L. Walton
*Attorney, Agent, or Firm*—William E. Johnson; Olin B. Johnson

[57] ABSTRACT

This specification teaches a method of preparing an article which is electronically conductive and resistant to corrosive attack by molten polysulfide salts. The method is carried out by the following steps. A sheet of graphite foil is coated with an amorphous pyrolytic or glassy carbon to fill any openings in and/or through the graphite foil. A thin layer of aluminum metal is coated onto at least one side of the graphite foil. The aluminum metal coated side of the graphite foil is bonded to an aluminum surface of an electronically conductive material. In this manner, an electronically conductive article is formed which is resistant to corrosive attack by molten polysulfide salts.

16 Claims, No Drawings

METHOD OF PREPARING AN ARTICLE WHICH IS RESISTANT TO CORROSIVE ATTACK BY MOLTEN POLYSULFIDE SALTS

TECHNICAL FIELD

This application is directed to a method of preparing an article which is electronically conductive but resistant to corrosive attack by molten polysulfide salts. The method finds particular utility in preparing conductors which may be immersed in molten polysulfide salts, a material which is developed during operation of a sodium sulfur battery. If desired, the article may define an electronically conductive container for molten polysulfide salts which are generated during discharge of a sodium sulfur battery.

BACKGROUND ART AND PRIOR ART STATEMENT

A novelty study carried out on the subject matter of this invention disclosure in the U.S. Patent and Trademark Office resulted in the citation of the following material: British Pat. No. 2,013,022; U.S. Pat. Nos. 4,024,320; 4,052,535; 4,069,372; 4,125,682; 4,129,690; and an article by Bird et al, "Sodium/Sulfur Cell Design for Quantity Production," Proceedings of the 13th Intersociety Energy Conversion Engineering Conference (Aug. 20-25, 1978), Society of Automotive Engineers, Inc.

Each of these citations will be discussed briefly below. However, it may be first said that I do not believe any of these citations in any manner show my method of preparing an article which is electronically conductive and resistant to corrosive attack by molten polysulfide salts. The differences between my method and the article produced thereby and the material disclosed will be apparent after I have discussed the individual citations and have had an opportunity to disclose the method of my invention and the article produced thereby hereinbelow.

British Pat. No. 2,013,022 shows a sodium sulfur cell having a solid electrolyte membrane separating sodium from a cathodic reactant comprising sulfur and sodium polysulfides. A cathode current collector is provided which, where exposed to the cathodic reactant, is formed of a nickel/chromium alloy which may be binary alloy or may contain further metals. This alloy has a protective oxide film, predominantly of nickel oxide. The nickel/chromium alloy may be a coating on a substrate of higher electrical conductivity such as aluminum. The particular coating which is placed on an electronically conductive article by the method of my invention is neither anticipated by nor made obvious by the nickel/chromium alloy shown in this patent.

U.S. Pat. No. 4,024,320 discloses a current collecting pole associated with an alkali metal/sulfur cell which comprises a first layer of an electronically conducting material which is resistant to the corrosive action of sulfur and alkali metal polysulfides (e.g., carbon or graphite). The first layer defines a continuous surface in contact with the sulfur and alkali metal polysulfides. There is also a second layer of a higher electronically conducting material which is in electrical contact with the first layer over the surface of the latter, remote from the sulfur and alkali metal polysulfides. Generally, this patent refers to a graphite or carbon tube with a plated metal outer layer or to a graphite or carbon tube with a plated metal layer inside the tube. The difference in whether the layer is on the outside or on the inside of the carbon tube depends on whether the alkali metal/sulfur cell is of the alkali metal core design or of a sulfur core design. The patent makes no mention of using aluminum or of bonding aluminum to graphite for use as an electronically conductive material and especially not in the manner which is proposed by the method of my invention.

U.S. Pat. No. 4,052,535 is directed to a sodium/sulfur cell having a solid electrolyte and a cathode current collector with a porous conductive matrix, e.g., carbon or graphite felt. The porous conductive matrix is in the region between the electrolyte and the current collector. The matrix is formed of a plurality of discrete elements with electronically conductive material, e.g., graphite foil, between the elements extending across the region between the current collector and the electrolyte to increase the conductivity across that region. No mention is made in this patent of how a bond can be formed between aluminum and graphite, nor does the patent mention what form of graphite on aluminum is used. The patent does talk about aluminum washers in contact with graphite foil washers, but there is no mention of a composite material formed of a graphite foil and aluminum, as will be taught by the method of my invention for preparing an article which is electronically conductive and resistant to corrosive attack by molten polysulfide salts.

U.S. Pat. No. 4,069,372 is directed to a electric accumulator with a solid electrolyte. After study of this patent, I do not see any pertinency in the teaching of this patent to the material disclosed and claimed in this specification.

U.S. Pat. No. 4,125,682 relates to a sodium/sulfur electric cell. The cell comprises a cathode tank containing sulfur, a solid electrolyte tube disposed in the tank and containing sodium. The cathode tank is lined with a continuous strip of felt or fabric which is made of graphite wound in a spiral. Once again, I do not find that the patent in any way anticipates or makes obvious the method of my invention.

U.S. Pat. No. 4,129,690 discloses a sodium sulfur cell in which the cathode current collector in the sodium/polysulfide cathodic reactant comprises an impermeable tube, e.g., a carbon or graphite tube, which is inserted into the cathodic reactant and contains a solid metal core, e.g., an aluminum core, and a deformable electronic conductor, e.g., graphite felt, as a conducting interface between the impermeable tube and the core. In this structure the electronic contact between the aluminum rod and the graphite tube is made by graphite felt. The electronic contact in this structure is achieved mechanically, e.g., by graphite felt compression. The patent in no way discloses a method of preparing an article which is electronically conductive and resistant to corrosive attack by molten polysulfide salts in accordance with my method.

The Bird et al article teaches a graphite foil liner used inside a sodium container for a sodium sulfur cell. The graphite foil liner is used to protect burn-through of the sodium container in the rare case of a failure of the electrolyte tube. The article does not in any way contain any discussion regarding corrosion protection of the sulfur electrode current collector for a sodium sulfur battery system.

As is well known to those skilled in the art, the principal problem associated with sodium sulfur batteries is the corrosiveness of the polysulfide material which is generated during discharge of such a battery. In order for sodium sulfur batteries to find use in applications such a load leveling by electric utilities, the battery must have a useful life of at least 10 years. However, it has been found that containers for containing the polysulfide material, which must also act as electronically conductive members, generally cannot be protected to withstand the polysulfide attack for such extended periods of time.

Generally, a sodium sulfur battery is a high energy density battery that operates in a temperature range of 300°–400° C. There are two basic battery designs currently being used. A first battery design is the so-called "sodium-core" design. The second battery design is the so-called "sulfur-core" design.

In the sodium-core design, the sodium is stored inside a sodium ion conducting ceramic electrolyte which is usually in a form of a closed end cylindrical tube. The sulfur and sodium polysulfide melt is outside the electrolyte with a porous carbon matrix, for example, graphite felt, and is contained within a metal container. During discharge, sodium ions pass through the ceramic electrolyte and combine with sulfide ions on the other side of the electrolyte to form sodium polysulfide. The current within the sulfur electrode is carried by the carbon matrix and sodium polysulfide melt to the outer metal container which acts as one of the current collectors for the cell.

In the sulfur-core design, the sulfur/sodium polysulfide melt is stored within the ceramic electrolyte and the sodium is stored outside the electrolyte. In this design, a metal current collector, usually in the form of a cylindrical rod in cylindrical cell designs, is placed inside the electrolyte in the polysulfide melt to act as a current collector.

In both designs, the metal current collectors, whether a sulfur container in the sodium-core design, or a metal current collector in the sulfur-core design, have to be protected by electrically conductive coatings that are corrosion resistant to sodium polysulfide melts. In addition, the coatings have to be well adhered and capable of withstanding thermal cycling between room temperature and 400° C. without peeling or flaking.

The method of this invention describes a method of bonding graphite foil to aluminum or to an aluminum coated substrate. For example, the aluminum coated substrate could be an aluminum coated steel or an aluminum coated stainless steel.

Graphite is electrically conductive and inert to sodium polysulfide melts under operating conditions of a sodium sulfur cell. Many graphite parts and current collectors have been used successfully in small laboratory cells. However, the electrical conductivity of graphite is 2–3 orders of magnitude lower than that of metals. In order to limit the electrical losses in larger cells, graphite is only used in thin layers to protect the underlying metal current collectors from highly corrosive sodium polysulfide melts.

Aluminum has high electrical conductivity. However, aluminum reacts with sodium polysulfide forming a passive, electrically insulating aluminum sulfide layer. Thus, aluminum by itself cannot be used as a current collector inside the sulfur electrode of a sodium sulfur cell unless it is covered by an electrically conductive and chemically nonreactive coating or layer such as graphite.

The method of this invention teaches how to prepare an article which is electronically conductive and resistant to corrosive attack by molten polysulfide salts. The method is one which teaches how graphite foil may be bonded directly to aluminum or an aluminum coated substrate in order to form such a corrosion resistant article.

DISCLOSURE OF THE INVENTION

This invention is directed to a method of preparing an article which is electronically conductive and, more particularly, to a method of preparing an article which is electronically conductive and resistant to corrosive attack by molten polysulfide salts. The method finds particular utility in the preparation of electronically conductive articles which may be used in association with molten polysulfide materials in a sodium sulfur battery.

In accordance with the general teachings of the method of my invention, an article which is electronically conductive and resistant to corrosive attack by molten polysulfide salts is prepared in the following manner. A sheet of graphite foil is provided. The graphite foil is coated with amorphous pyrolytic carbon to fill any openings in and/or through the graphite foil. A thin layer of aluminum metal is coated onto at least one side of the graphite foil which has been previously coated with the amorphous pyrolytic carbon. An electronically conductive material having an aluminum surface is provided. The aluminum metal coated side of the graphite foil which has been coated with the amorphous pyrolytic carbon is bonded to the aluminum surface of the electronically conductive material. In such a manner there is formed an article which is electronically conductive and resistant to corrosive attack by molten polysulfide salts. The electronically conductive material may be solid aluminum or it may be an aluminum coated substrate, for example, an aluminum coated stainless steel.

A later section of this specification will teach the best mode which is now contemplated for carrying out the method of my invention. The principal requirements of the method are that a thin layer of aluminum metal be coated onto the graphite foil which has been previously coated with the amorphous pyrolytic carbon, and that the so-coated side of the graphite foil be bonded to an aluminum surface of an electronically conductive material.

BEST MODE AND INDUSTRIAL APPLICABILITY

The novel features that are considered charactristic of the invention are set forth with particularly in the appended claims. The invention itself, however, both as to its organization and its method of operation, together with additional objects and advantages thereof, will best be understood from the following description of specific embodiments.

The following description of specific embodiments is what I consider to be my preferred embodiments of the method of preparing an article which is electronically conductive and resistant to corrosive attack by molten polysulfide salts. The following description also sets forth what I now contemplate to be the best mode of carrying out the method of my invention. The description is not intended to be a limitation upon the broader principles of this method and, while preferred materials and processing conditions are used to teach the method, it does not mean that other materials and processing conditions cannot be used.

EXAMPLE 1

A preferred method of preparing an article which is electronically conductive but resistant to corrosive attack by molten polysulfide salts is demonstrated in this example.

The method is initiated by providing a sheet of graphite foil. In particular, a suitable graphite foil material is Grafoil, sold by Union Carbide Company. This material comes in thicknesses of 0.005–0.025 inch and is composed of 99.9% graphite (GTA grade). The sheet may have small valleys and indentations and even have some openings therethrough. In order to make the sheet impervious to polysulfide materials, I prefer to have the sheet coated with an amorphous pyrolitic or glassy form of carbon to fill up any undulations or valleys and to plug and seal any holes or openings therethrough. The glassy carbon may be placed on the graphite foil, for example, in a pyrolytic coating operation. Many such pyrolytic graphite coating operations are well known in the art (see, for example, *Applied Spect.*, 32, 402, 1978; or *Atomic Absorption Newsletter*, 15, 42, 1976). A particularly suitable form of applying pyrolytic carbon is one wherein methane, in an inert carrier gas such as argon or nitrogen, is brought into contact with the graphite foil at high temperatures of 2000°–2300° C., whereby the methane is broken down to permit the formation of amorphous carbon on the graphite foil to plug and seal any openings therethrough and to fill any undulations or valleys therein. Thus, the second step of my method is that of coating the graphite foil with amorphous pyrolytic or glassy carbon to fill any openings in and through the graphite foil and to make the foil impervious to sulfur and sodium polysulfide melts once that graphite foil material has been so coated.

The graphite foil coated with the amorphous pyrolytic or glassy carbon has a thin layer of aluminum metal coated onto at least one side thereof. The aluminum layer may be placed on the one side of the graphite foil by a vacuum vapor deposition or by sputtering, or by any other means, in an oxygen free environment, so that the layer placed on the graphite foil is a layer of aluminum with a minimal amount of aluminum oxide present. It is important that the aluminum should come into direct contact with the graphite to allow chemical reactions to take place between the aluminum and the graphite and that this process should be unhindered by the presence of a thick aluminum oxide layer at the aluminum/graphite interface. The occurrence of this coating process in an oxygen free ambient to achieve the application of aluminum is important in achieving a good bond between the aluminum and the graphite.

Generally, the thickness of the aluminum metal coating on the graphite sheet is not critical, but layers of 1–2 microns in thickness work well.

The next step in the method of my invention for preparing an article which is electronically conductive and resistant to corrosive attack by molten polysulfide salts is that of providing an electronically conductive material having an aluminum surface. The electronically conductive material may be a solid aluminum material or may be an aluminum cladded material such as an aluminum cladded stainless steel.

The aluminum metal coated side of the graphite foil coated with the amorphous pyrolytic or glassy carbon is bonded to the aluminum surface of the electronically conductive material. For example, the aluminum precoated side of the graphite foil can be placed against the aluminum surface of the electronically conductive material. The articles are then heated in an inert atmosphere, such as argon, at a pressure of 500–2000 psi, preferably 1500–2000 psi, to a temperature of 400°–625° C., preferably 550°–625° C. The heating is carried out for a period of time of 2–20 hours, preferably 4–8 hours. The time selected is a time sufficient to allow a diffusion bond to form between the aluminum layer on the graphite foil and the aluminum surface of the electronically conductive material and for a chemical bond to form between aluminum and carbon at the aluminum/foil interface. The composite material so-formed is a composite material which is electronically conductive and resistant to corrosive attack by molten polysulfide salts.

EXAMPLE 2

This example is similar to Example 1, except that a thin layer of cryolite is applied on the aluminum surface of the electronically conductive material before the aluminum metal coated side of the graphite foil is placed in contact therewith and heated. The cryolite facilitates the bonding between the two aluminum surfaces by dissolving and distrupting any thin aluminum oxide layers which may be present. The cryolite may be placed on the surface by mixing cryolite powder with alcohol to form a slurry and then using a brush to apply a thin coating on the aluminum. The cryolite acts either to dissolve any aluminum oxide layer or allows diffusion of aluminum through the oxide layer to the graphite interface and thus allows the metal aluminum of the surface of the electronically conductive material to wet the graphite. Aluminum and graphite react to form aluminum carbide which contributes adhesion between the graphite and the aluminum.

EXAMPLE 3

This example is similar to Example 1, except that the graphite foil is not precoated with aluminum. Instead, a thin layer of cryolite is applied on the aluminum or on the aluminum coated metal or substrate as in Example 2. The cryolite disrupts the aluminum oxide on the surface of aluminum at temperatures of 400°–625° C. and allows the chemical reactions to occur between the glassy carbon coated graphite foil and the aluminum, thus forming a strong chemical bond between the foil and aluminum.

While particular embodiments of the method of my invention and article produced thereby have been illustrated and described, it will be obvious to those skilled in the art that various changes and modifications may be made without departing from the invention, and it is intended to cover in the appended claims all such modifications and equivalents as fall within the true spirit and scope of this invention.

I claim:

1. A method of preparing an article which is electronically conductive and resistant to corrosive attack by molten polysulfide salts, which method comprises the steps of:
   (a) providing a sheet of graphite foil;
   (b) coating said graphite foil with amorphous pyrolytic or glassy carbon to fill any openings in and/or through said graphite foil;
   (c) coating a thin layer of aluminum metal onto at least one side of said graphite foil coated with said amorphous carbon;

(d) providing an electronically conductive material having an aluminum surface; and (e) bonding said aluminum metal coated side of said graphite foil coated with said amorphous carbon to an aluminum surface of an electronically conductive material, thereby to form an electronically conductive article resistant to corrosive attack by molten polysulfide salts.

2. The method of claim 1, in which said coating operation is carried out in an oxygen free environment.

3. The method of claim 2, in which said coating operation is selected from the group of coating operations consisting of vacuum vapor deposition and sputtering.

4. A method of preparing an article which is electronically conductive and resistant to corrosive attack by molten polysulfide salts, which method comprises the steps of:

(a) providing a sheet of graphite foil;

(b) coating said graphite foil with amorphous pyrolytic or glassy carbon to fill any openings in and/or through said graphite foil;

(c) coating a thin layer of aluminum metal onto at least one side of said graphite foil coated with said amorphous carbon;

(d) providing an electronically conductive material having an aluminum surface; and (e) bonding by means of heat and pressure said aluminum metal coated side of said coated graphite foil to an aluminum surface of an electronically conductive material, thereby to form an electronically conductive article resistant to corrosive attack by molten polysulfide salts.

5. The method of claim 4, in which said bonding opertion is carried out at a temperature in a range of 400°–625° C. and at a pressure in a range of 500–2000 psi for a period of time of 2–20 hours.

6. The method of claim 4, in which said bonding operation is carried out at a temperature in a range of 550°–625° C. and at a pressure in a range of 1500–2000 psi for a period of time of 4–8 hours.

7. The method of claim 6, in which said coating operation is carried out in an oxygen free environment.

8. The method of claim 7, in which said coating operation is selected from the group of coating operations consisting of vacuum vapor deposition and sputtering.

9. As a new electronically conductive article of manufacture, an article which is made by a method which comprises the steps of:

(a) providing a sheet of graphite foil;

(b) coating said graphite foil with amorphous pyrolytic or glassy carbon to fill any openings in and/or through said graphite foil;

(c) coating a thin layer of aluminum metal onto at least one side of said graphite foil coated with said amorphous carbon;

(d) providing an electronically conductive material having an aluminum surface; and (e) bonding said aluminum metal coated side of said graphite foil coated with said amorphous carbon to an aluminum surface of an electronically conductive material, thereby to form an electronically conductive article.

10. The new electronically conductive article of claim 9, in which said coating operation of said graphite foil is carried out in an oxygen free environment.

11. The new electronically conductive article of claim 10, in which said coating operation of said graphite foil is selected from the group of coating operations consisting of vacuum vapor deposition and sputtering.

12. As a new electronically conductive and molten polysulfide salt resistant article of manufacture, an article which is made by a method which comprises the steps of:

(a) providing a sheet of graphite foil;

(b) coating said graphite foil with amorphous pyrolytic or glassy carbon to fill any openings in and/or through said graphite foil;

(c) coating a thin layer of aluminum metal onto at least one side of said graphite foil coated with said amorphous carbon;

(d) providing an electronically conductive material having an aluminum surface; and (e) bonding by means of heat and pressure said aluminum metal coated side of said graphite foil to an aluminum surface of an electronically conductive material, thereby to form an electronically conductive article resistant to corrosive attack by molten polysulfide salts.

13. The new electronically conductive and molten polysulfide salt resistant article of claim 12, in which said bonding operation is carried out at a temperature in a range of 400°–625° C. and at a pressure in a range of 500–2000 psi for a period of time of 2–20 hours.

14. The new electronically conductive and molten polysulfide salt resistant article of claim 12, in which said bonding operation is carried out at a temperature in a range of 550°–625° C. and at a pressure in a range of 500–2000 psi for a period of time of 4–8 hours.

15. The new electronically conductive and molten polysulfide salt resistant article of claim 14, in which said coating operation is carried out in an oxygen free environment.

16. The new electronically conductive and molten polysulfide salt resistant article of claim 15, in which said coating operation is selected from the group of coating operations consisting of vacuum vapor deposition and sputtering.

* * * * *